United States Patent
Flowerday et al.

(10) Patent No.: US 10,193,770 B2
(45) Date of Patent: Jan. 29, 2019

(54) SUPPLYING DATA FILES TO REQUESTING STATIONS

(75) Inventors: Crispin Edward Harold Flowerday, Cambridge (GB); Owen John Garrett, Ely (GB); Ben Ross Mansell, Cambridge (GB); Julian Trowan John Midgley, Waterbeach (GB)

(73) Assignee: PULSE SECURE, LLC, San Jose, CA (US)

( * ) Notice: Subject to any disclaimer, the term of this patent is extended or adjusted under 35 U.S.C. 154(b) by 914 days.

(21) Appl. No.: 12/554,113

(22) Filed: Sep. 4, 2009

(65) Prior Publication Data

US 2010/0070625 A1  Mar. 18, 2010

(30) Foreign Application Priority Data

Sep. 5, 2008 (EP) ..................................... 08252966

(51) Int. Cl.
H04L 12/26 (2006.01)
H04L 29/08 (2006.01)

(52) U.S. Cl.
CPC ........ H04L 43/024 (2013.01); H04L 67/1002 (2013.01); H04L 67/1008 (2013.01);
(Continued)

(58) Field of Classification Search
CPC ............... H04L 43/024; H04L 67/1008; H04L 67/1012; H04L 67/1002; H04L 67/1014; H04L 67/1029
(Continued)

(56) References Cited

U.S. PATENT DOCUMENTS 5,774,660 A * 6/1998 Brendel et al. ................ 709/201
6,049,821 A * 4/2000 Theriault et al. ............. 709/203
(Continued)

FOREIGN PATENT DOCUMENTS

EP 0892531 A 1/1999
GB 2413868 A 11/2005
(Continued)

Primary Examiner — Philip J Chea
Assistant Examiner — Wing Ma
(74) Attorney, Agent, or Firm — Park, Vaughan, Fleming & Dowler LLP; Laxman Sahasrabuddhe

(57) ABSTRACT

Data files are supplied to a plurality of requesting stations (102 to 106) by accessing serving devices (109 to 116). A plurality of requests are received for one or more data files at a traffic management system (101) from requesting stations via an external network (107). A specific server is selected at the traffic management system and a request is issued to the selected server over a local network for the requested file. The requested file is accepted at the traffic management system from the selected server over the local network and the requested file is sent from the traffic management system to the requesting station over external network. The response of selected servers is monitored (302) when responding to issued requests thereby generating monitored responses. The monitored responses are compared (303) against an operational criterion to identify sub-standard operations. Thereafter, where appropriate, measures are taken (305) to reduce the processing demand placed upon the selected server so as to improve the monitored operation of the selected server.

7 Claims, 8 Drawing Sheets

(52) U.S. Cl.
CPC ...... *H04L 67/1012* (2013.01); *H04L 67/1014* (2013.01); *H04L 67/1029* (2013.01); *H04L 67/2823* (2013.01)

(58) Field of Classification Search
USPC ........................................................ 709/224
See application file for complete search history.

(56) References Cited

U.S. PATENT DOCUMENTS

| | | | |
|---|---|---|---|
| 6,263,368 B1* | 7/2001 | Martin | 709/224 |
| 6,822,940 B1* | 11/2004 | Zavalkovsky | H04L 47/10 370/235 |
| 7,054,943 B1* | 5/2006 | Goldszmidt | G06F 9/505 370/231 |
| 7,062,556 B1* | 6/2006 | Chen | G06F 9/505 709/201 |
| 7,092,399 B1* | 8/2006 | Cheriton | 370/401 |
| 7,284,051 B1* | 10/2007 | Okano et al. | 709/226 |
| 7,712,103 B2* | 5/2010 | Takahisa | G06F 9/5083 709/201 |
| 8,037,475 B1* | 10/2011 | Jackson | G06F 9/5027 718/104 |
| 8,423,662 B1* | 4/2013 | Weihl | G06F 9/505 709/238 |
| 8,775,549 B1* | 7/2014 | Taylor | H04L 67/1097 707/609 |
| 2001/0029545 A1* | 10/2001 | Takahashi et al. | 709/234 |
| 2002/0010798 A1* | 1/2002 | Ben-Shaul et al. | 709/247 |
| 2002/0099785 A1* | 7/2002 | Teeple | 709/214 |
| 2002/0120727 A1* | 8/2002 | Curley et al. | 709/223 |
| 2002/0138643 A1* | 9/2002 | Shin | H04L 47/10 709/232 |
| 2002/0163914 A1* | 11/2002 | Dooley | H04L 12/5601 370/394 |
| 2002/0194324 A1* | 12/2002 | Guha | 709/223 |
| 2003/0135609 A1* | 7/2003 | Carlson | G06F 9/5011 709/224 |
| 2003/0145236 A1* | 7/2003 | Tateoka | H04L 63/1408 726/12 |
| 2003/0179703 A1* | 9/2003 | Levy | H04L 41/06 370/230 |
| 2004/0081183 A1* | 4/2004 | Monza | H04L 41/06 370/412 |
| 2004/0111506 A1* | 6/2004 | Kundu | H04L 67/42 709/223 |
| 2004/0264377 A1* | 12/2004 | Kilkki | H04L 47/10 370/235 |
| 2005/0018611 A1* | 1/2005 | Chan | H04L 41/147 370/241 |
| 2005/0041583 A1* | 2/2005 | Su | H04L 43/065 370/235 |
| 2005/0050212 A1* | 3/2005 | Mills et al. | 709/229 |
| 2005/0091344 A1* | 4/2005 | Chen | H04L 67/322 709/219 |
| 2005/0198231 A1* | 9/2005 | Gasca et al. | 709/221 |
| 2005/0276219 A1* | 12/2005 | Wang | H04L 12/14 370/229 |
| 2006/0020684 A1* | 1/2006 | Mukherjee et al. | 709/219 |
| 2006/0064483 A1* | 3/2006 | Patel | 709/224 |
| 2006/0212594 A1* | 9/2006 | Haner | H04L 67/322 709/232 |
| 2006/0253457 A1* | 11/2006 | Takahashi et al. | 707/10 |
| 2006/0294207 A1* | 12/2006 | Barsness | G06F 9/50 709/220 |
| 2007/0083639 A1* | 4/2007 | Gilbert et al. | 709/224 |
| 2007/0112723 A1* | 5/2007 | Alvarez | G06F 9/50 |
| 2007/0136469 A1* | 6/2007 | Nusbickel | 709/226 |
| 2007/0140301 A1* | 6/2007 | Kailash | H04L 43/024 370/498 |
| 2007/0208843 A1* | 9/2007 | Wexler et al. | 709/223 |
| 2007/0220139 A1* | 9/2007 | Ohta et al. | 709/224 |
| 2007/0230339 A1* | 10/2007 | Chen | H04L 47/10 370/230 |
| 2007/0260732 A1* | 11/2007 | Koretz | 709/226 |
| 2007/0263541 A1* | 11/2007 | Cobb et al. | 370/235 |
| 2007/0280686 A1* | 12/2007 | Amemiya | H04L 41/0806 398/51 |
| 2007/0297336 A1* | 12/2007 | Pitcher | H04L 47/10 370/236 |
| 2007/0299965 A1* | 12/2007 | Nieh et al. | 709/224 |
| 2008/0154837 A1* | 6/2008 | Morimura et al. | 706/48 |
| 2008/0168446 A1* | 7/2008 | Shen et al. | 718/101 |
| 2008/0222727 A1* | 9/2008 | Sample | G06F 21/55 726/23 |
| 2008/0291923 A1* | 11/2008 | Back | H04L 45/04 370/396 |
| 2009/0240644 A1* | 9/2009 | Boettcher | H04L 41/142 706/47 |
| 2009/0245115 A1* | 10/2009 | Krishnaswamy | H04L 41/5025 370/242 |
| 2009/0254660 A1* | 10/2009 | Hanson | H04L 12/10 709/226 |
| 2009/0265458 A1* | 10/2009 | Baker | H04L 47/10 709/224 |
| 2010/0010991 A1* | 1/2010 | Joshi | H04L 67/1002 707/E17.017 |
| 2010/0036952 A1* | 2/2010 | Hazlewood et al. | 709/226 |
| 2010/0107172 A1* | 4/2010 | Calinescu | G06F 9/5061 718/104 |
| 2010/0138688 A1* | 6/2010 | Sykes | H04L 41/147 714/4.1 |
| 2015/0139540 A1* | 5/2015 | Moraleda | G06F 17/30247 382/164 |

FOREIGN PATENT DOCUMENTS

| | | |
|---|---|---|
| GB | 2414136 A | 11/2005 |
| WO | 0033536 A | 6/2000 |
| WO | 2005093587 A | 10/2005 |

* cited by examiner

SUPPLYING DATA FILES TO REQUESTING STATIONS

CROSS REFERENCE TO RELATED APPLICATIONS

This application claims priority from European Patent Application No. 08 252 966, filed 5 Sep. 2008, the whole contents of which are incorporated herein by reference in their entirety.

BACKGROUND OF THE INVENTION

1. Field of the Invention

The present invention relates to traffic managing apparatus for supplying data files to requesting stations. The present invention also relates to a method of supplying data files to a plurality of requesting stations by accessing serving devices.

2. Description of the Related Art

Traffic management systems for providing load balancing are known, as described in United Kingdom patent number 2 413 868 and United Kingdom patent number 2 414 136, both in the name of the present applicant. Traffic management systems of this type are deployed when very high demands are placed upon particular websites. Thus a website, in the form of one or more HTML files, may be duplicated across many servers, groups of which may be clustered together with access being provided over a local network. An incoming request for the file is initially sent to the traffic management processor which is then responsible for selecting a particular server, possibly in a round robin fashion, issuing a request to the selected server over the local network and then accepting the requested file, so that it may be in turn sent back to the requesting station.

When installing a system of this type, it is necessary to make an estimate of the expected level of demand so that web pages will be returned in an acceptable period of time and a requesting station will therefore experience an acceptable grade of service. An acceptable grade of service for example may state that having issued a request to a server, the requested file should start to be received from the server within two seconds. Thus, if 90% of files are returned within this two second period, the grade of service may be considered acceptable. Consequently, the provision of hardware in order to achieve this grade of service should be good enough, given that excessive redundancy would be expensive and ultimately lead to the operation being uncompetitive.

Given these constraints of providing a level of service that is good enough, problems occur when excessive demand is placed on a particular website. For an information based website, excessive demand may occur when a particular event takes place. Similarly, for a commercial website excessive demand may occur when special offers are available or as a result of a successful advertising campaign. Under these circumstances, an unexpected level of demand may be placed on the website resulting in a substandard level of service which may result in customers waiting too long or, ultimately, in requests being lost. Such an experience may have detrimental side effects in that customers may be reluctant to access the website again and these would include regular customers.

BRIEF SUMMARY OF THE INVENTION

According to a first aspect of the present invention, there is provided a traffic managing apparatus for supplying data files to a plurality of requesting stations, by accessing serving devices, comprising a first interface to an external network for receiving requests from a plurality of requesting stations and for sending a requested file back to a requesting station, a second interface to an internal network for issuing requests to a plurality of servers to effect load balancing and for receiving a requested file from a requested server, and a processing device configured to monitor the response of the servers, characterised by being configured to monitor the response of selected servers when responding to issued requests, thereby generating monitored responses, compare the monitored responses against an operational criterion to identify sub-standard operation, and take measures to reduce the processing demand placed upon the selected server so as to improve the monitored operation of the selected server.

According to a second aspect of the present invention, there is provided a method of supplying data files to a plurality of requesting stations by accessing serving devices of the aforesaid type, comprising the steps of: receiving a plurality of requests for one or more data files at a traffic management system from a plurality of requesting stations via an external network, selecting a specific server (the selected server) at the traffic management system, issuing a request to the selected server over a local network for the requested file, accepting the requested file at the traffic management system from the selected server over the local network, and sending the requested file from the traffic management system to the requesting station over the the external network, characterised by monitoring the response of selected servers when responding to issued requests, thereby generating monitored responses; comparing the monitored responses against an operational criterion to identify sub-standard operation, and taking measures in response to said comparison to reduce the processing demand placed upon the selected server so as to improve the monitored operation of said selected server.

BRIEF DESCRIPTION OF THE SEVERAL VIEWS OF THE DRAWINGS

The invention will now be described by way of example only with reference to the accompanying drawings, of which.

DETAILED DESCRIPTION OF THE PREFERRED EMBODIMENTS

FIG. 1

Figure 1:
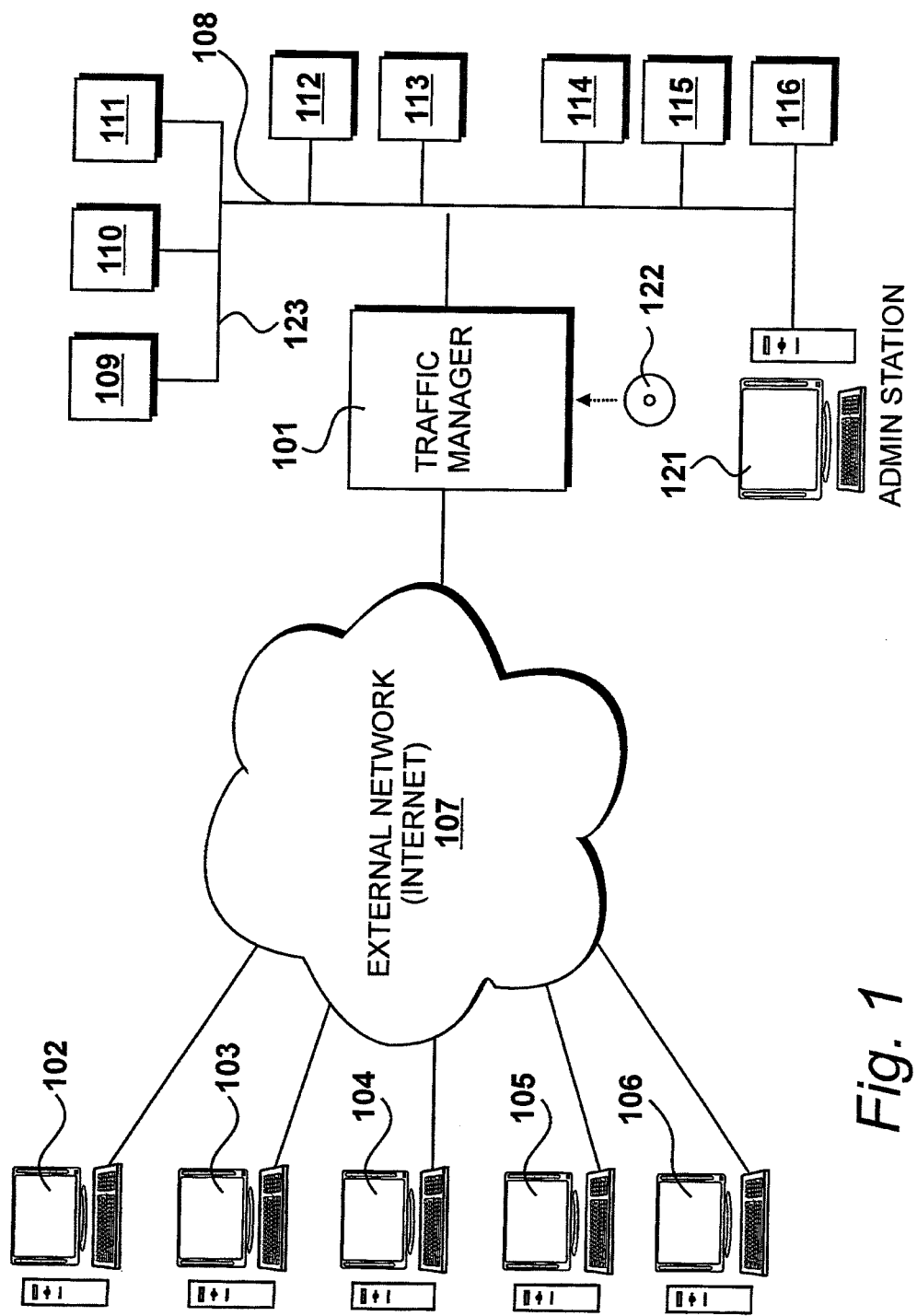
FIG. 1 shows data distribution over the Internet, including a traffic managing system.

Traffic managing apparatus 101 is illustrated in FIG. 1 that is configured to supply data files to requesting stations 102, 103, 104, 105, 106 etc via the Internet 107. Physical serving devices 109, 110, 111, 112, 113, 114, 115 and 116 may be organised into server pools configured to provide different functionality. However, the present invention does not need to take account of the capabilities of each server and other procedures will be concerned with directing appropriate requests. The present invention is concerned with monitoring the response of the servers and taking appropriate action so as not to overload the servers.

In order to facilitate the configuration of the servers and the traffic management system 101, an administration station 121 is provided, having human interface peripheral equipment such as a monitor and keyboard etc. In addition, a data carrying medium such as a DVD 122 is illustrated as a means for supplying executable instructions for the traffic managing process. Alternatively, traffic managing instructions may be loaded onto the traffic management system from an external source and the transfer of such instructions may be controlled via the administration system 121. The servers 109, the administration station 121 and the traffic manager 101 communicate via a high bandwidth internal network 108.

FIG. 2

Figure 2:
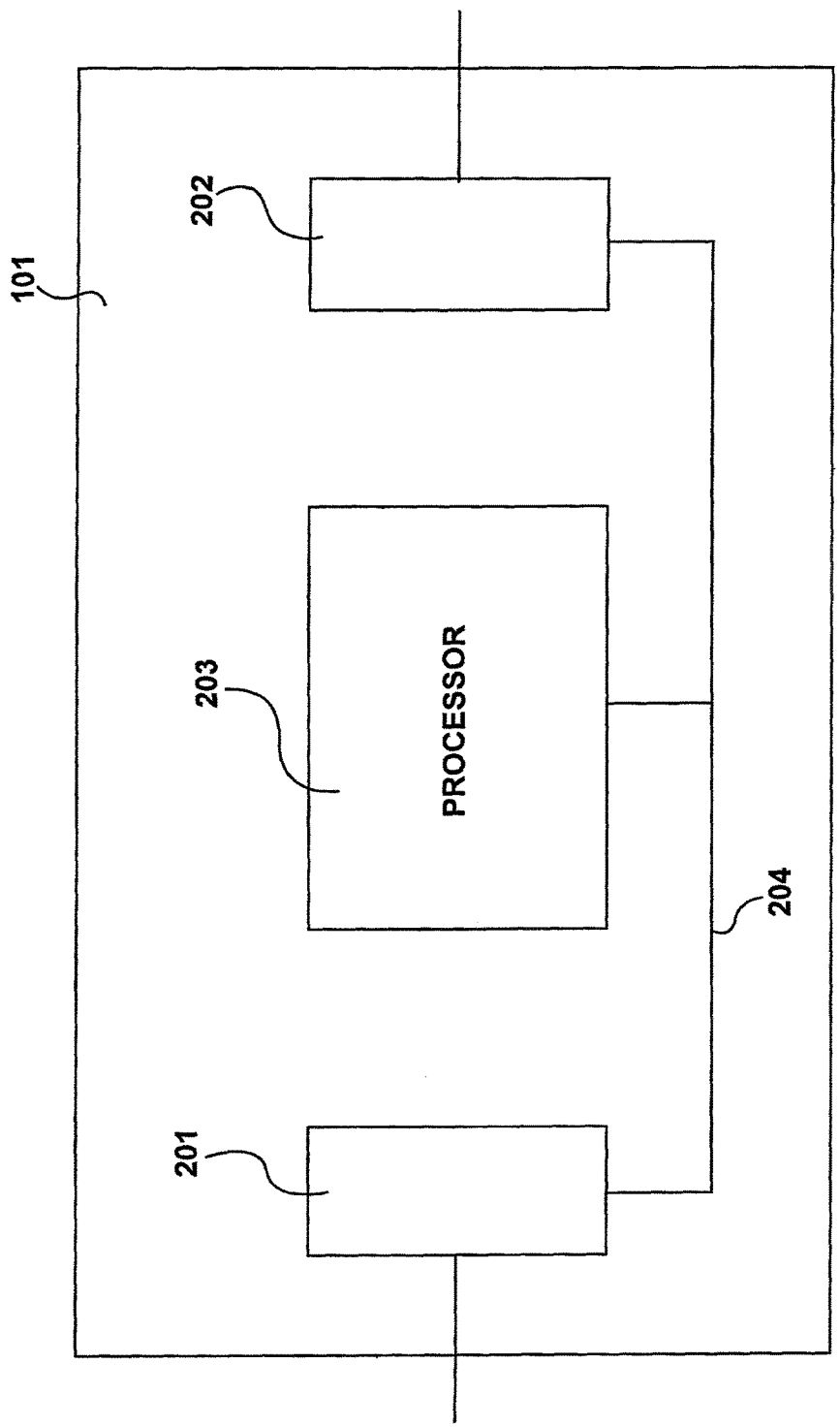
FIG. 2 details the traffic managing system identified in FIG. 1.

The traffic managing system 101 is detailed in FIG. 2 and comprises a first interface 201 to the external Internet 107 for receiving requests from the requesting stations 102 to 106 and for sending a requested file back to the requesting station. In addition, there is provided a second interface 202 for interfacing to internal network 108 and this in turn issues requests to the servers 109 to 116 to effect load balancing and for receiving requested files from a requested server. The traffic managing system 101 also includes a processing device 203 and said devices 201, 202 and 203 communicate via an internal bus 204.

FIG. 3

Figure 3:
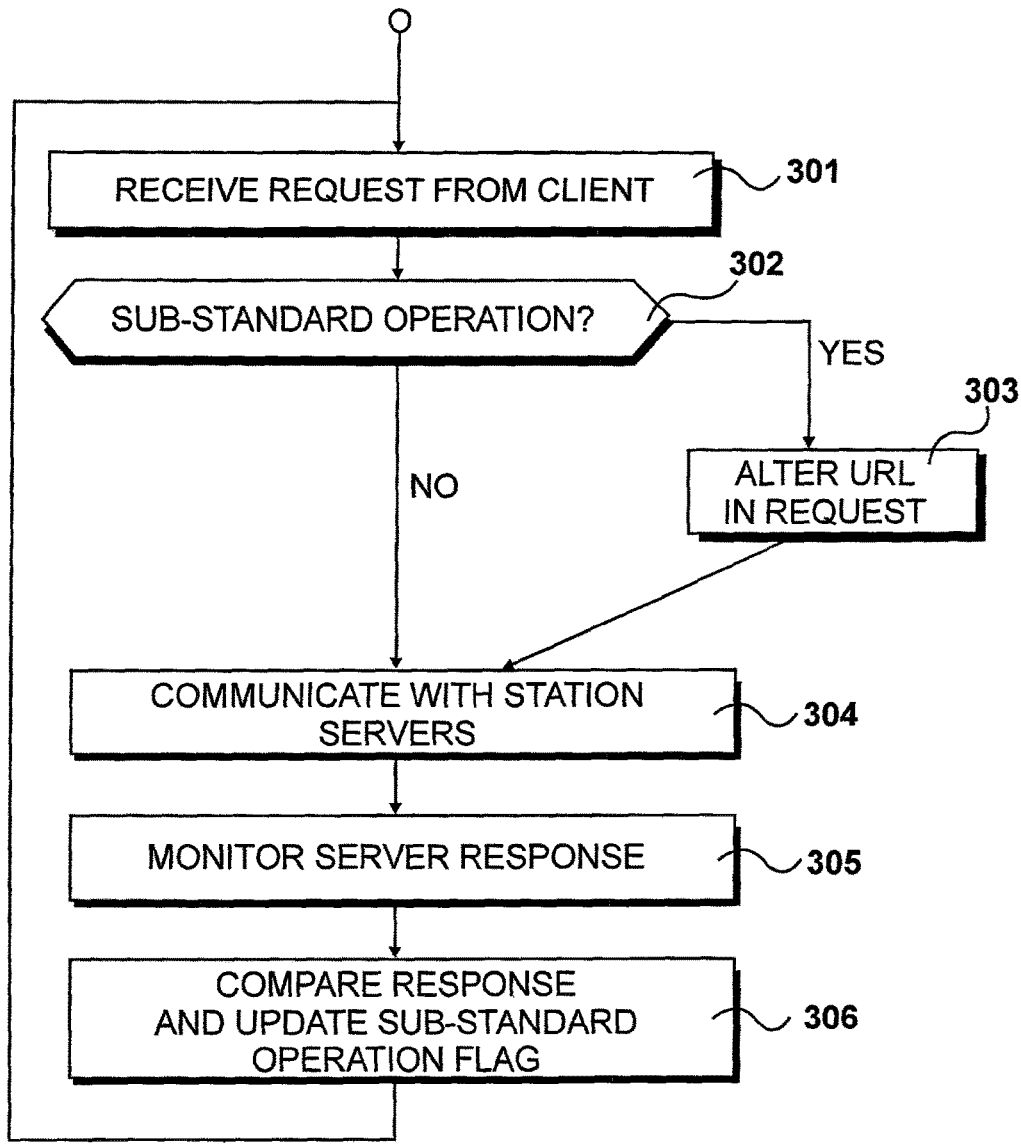
FIG. 3 shows procedures performed by a processing device identified in FIG. 2.

Procedures performed by the processing device 203 of FIG. 2 are illustrated in FIG. 3. At step 301 a request is received from a client and at step 302 a question is asked as to whether substandard operation is taking place. When answered in the affirmative, the URL is changed at step 303. Thereafter, at step 304 communication with station servers takes place. Thus, if the question asked at step 302 is answered in the negative, step 303 is bypassed and server communication takes place at step 304.

At step 305 the server response is monitored and at step 306 the monitored response is compared with the previous responses and where appropriate a substandard operation flag is set. Thus, when set in this way, as a result of monitoring substandard response, the question asked at step 302 will be answered in the affirmative.

FIG. 4

Figure 4:
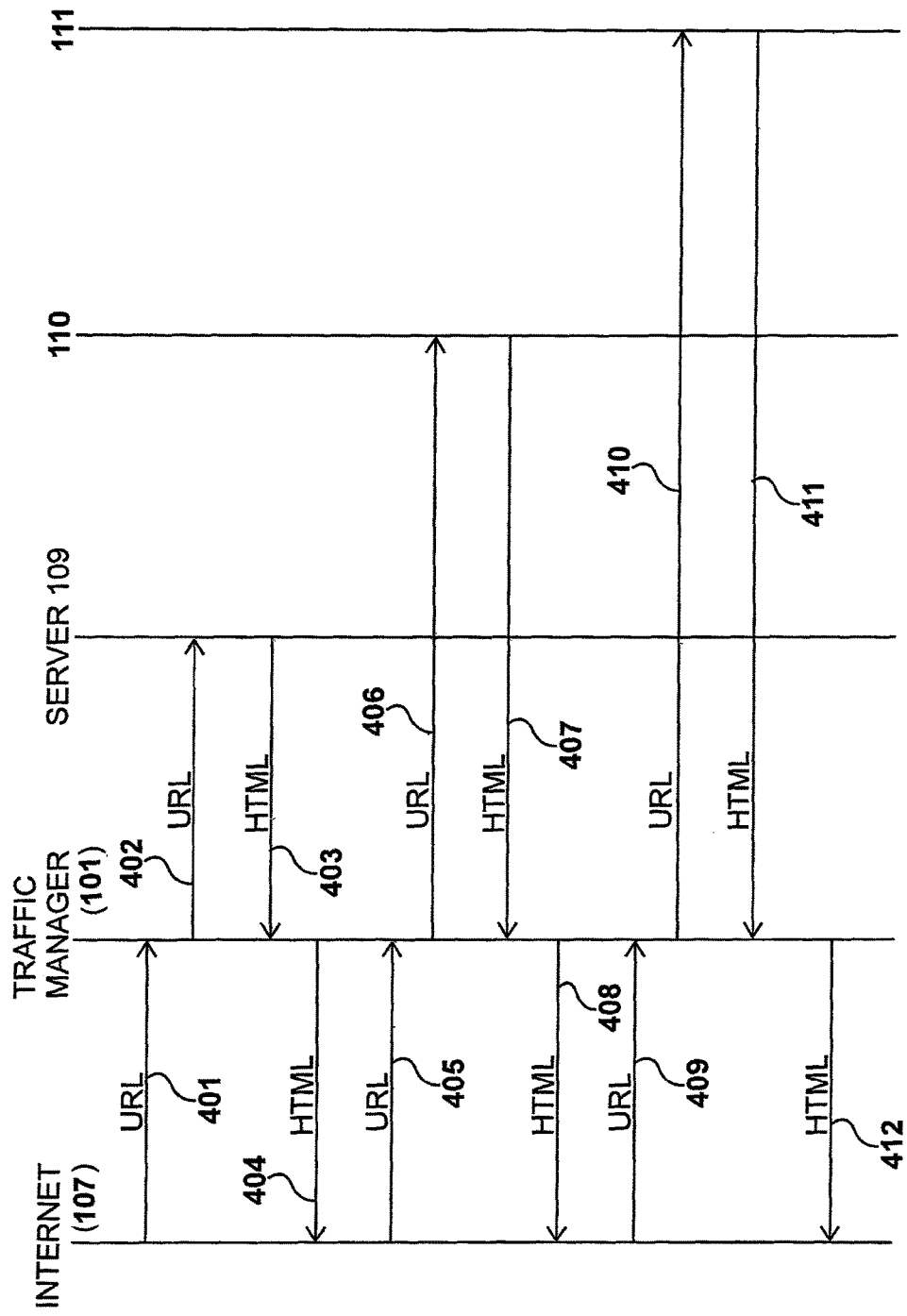
FIG. 4 illustrates a protocol diagram for components identified within FIG. 3.

A protocol diagram is illustrated in FIG. 4 detailing procedures 301 for the communications between the traffic management system 101 and the requesting stations 102 to 106 and between a traffic management system 101 and the servers 109 to 116.

For the purposes of illustration, it is assumed that the load balancing activities of the traffic management system 101 will effectively adopt a round robin approach. Thus, traffic manager 101 receives a request 401 in the form of a URL from the Internet 107. In normal operation, this URL is conveyed 402 to the server 109. At server 109 appropriate action is taken in order to generate the requested page which is then returned as HTML 403. The returned HTML is accepted at the traffic management system 120 and then conveyed as 404 back to the requesting station, via the Internet 107.

The next request is shown being received at 405. On this occasion, the request is issued as shown at 406 to the next server 110. Again, server 110 takes measures in order to generate the requested file and then the generated file is accepted back at the traffic management system 101 as illustrated at 407. Thereafter, the file is sent to the requesting station via the Internet 107 as illustrated at 408.

Upon receiving the next request, as illustrated at 409, the traffic manager 101 issues a request, as illustrated at 410, to the next server 111. Again, server 111 takes the necessary action required in order to generate the requested data which is then accepted by the traffic management system 101 as illustrated at 411. Thereafter, the accepted file is sent to the requesting station via the Internet 107, as illustrated at 412.

It is generally accepted practice for the servers 109 to 116 themselves to be multitasking and with each request issued by the traffic management system 101 a new thread will be instantiated. Furthermore, the processing capability available at the servers will be distributed so as to satisfy as many requests in parallel as possible. However, a physical limit will occur, particularly when there is a high demand placed on each of the servers and particularly when the amount of processing required to generate each page is relatively large. Thus, although the load balancing exercises performed by the traffic management system 101 will endeavour to distribute the load upon the servers and possibly take action should part of the network fail, ultimately a point will be reached at which it is not possible for all of the requests to be satisfied to the desired level of service. As this point is reached, it would be possible for manual intervention to take place so as to modify the way in which the servers respond to the requests. However, such an approach may be considered as a brutal intervention in that, having made the modification, further manual intervention will be required in order to return the system back to its preferred mode of operation. Consequently, it is possible that demand could diminish and an unnecessary intervention could remain in place. Thus, the present invention seeks to monitor server response, compare the response against an established criterion, determine whether substandard operation is taking place and then, where appropriate, take measures in order to re-establish standard operation in terms of grade of service.

FIG. 5

Figure 5:
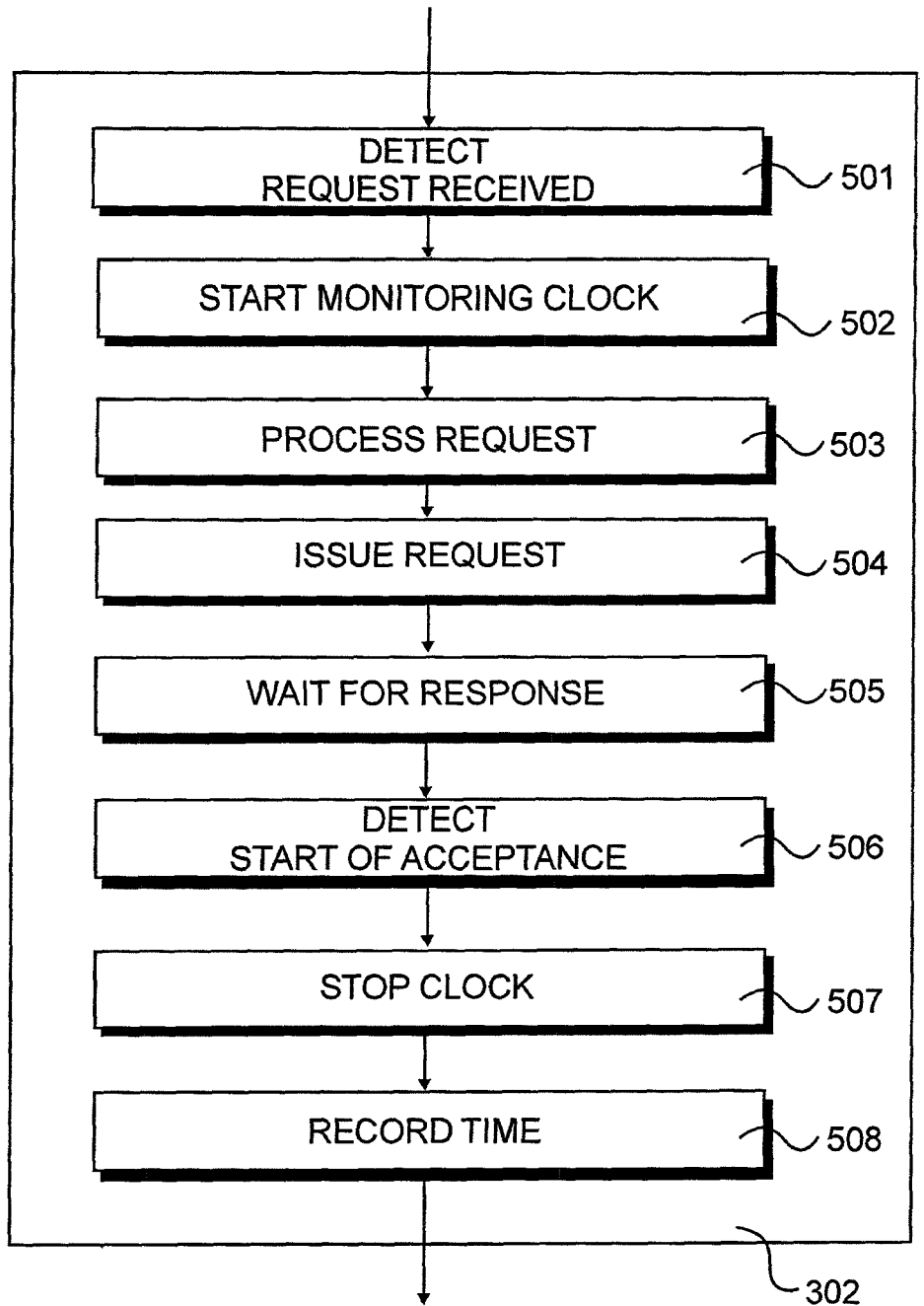
FIG. 5 details procedures for monitoring server response, identified in FIG. 3.

As previously described with respect to FIG. 3, process 302 monitors the server response so that appropriate measures may be taken should this be considered appropriate. In order to obtain an indication of the operational condition of each of the servers, it would be possible to look at the total number of connections that are concurrently running or alternatively it would be possible to look at the number of connections to a particular node connected to a handler request. Another alternative approach would be to execute code at each of the servers which would then in turn provide an indication back to the traffic management system 101 as to how loaded they actually are. Thus, using a mechanism of this type, it would be possible to obtain a direct indication of the extent to which the processing capabilities within each of the servers is being used. A further alternative approach would be to consider the load placed on the processing device 203 at the traffic management system 101 itself. However, a preferred approach for monitoring server response is detailed in FIG. 5.

Essentially, the preferred approach for monitoring server response consists of measuring the time taken between the traffic manager 101 receiving a request from the Internet 107 and the point at which the requested file begins to be accepted by the traffic management system. This period represents the amount of time required in order for a server to receive a request and perform the necessary processing operations in order to start serving the requested file. In addition, this period also includes any pre-processing performed at the processing device 203, within the traffic management system 101.

At step 501 the fact that a request has been received at the traffic management system 101 is detected. Thereafter, at step 502 a monitoring clock starts to run. At step 503 this particular process waits while the request is processed and then issued at step 504. The waiting stage is illustrated at step 505.

At step 506 the start of the acceptance of the data file from the selected server is detected such that at step 507 the clock is stopped and the time is then recorded at step 508.

Thus, a preferred procedure (illustrated in FIG. 5) calculates the time taken from a request being received at the traffic management system 101 and the start of the requested file being accepted back at the traffic management system 101. It is then necessary for a comparison to take place as illustrated at step 303 in order that a question may be asked at step 304 as to whether substandard operations taking place.

It is therefore necessary to have a criterion or criteria establishing what is considered to be an acceptable grade of service. For the purposes of this illustration, it will be assumed that the level of service being provided is considered to be acceptable if 80% of requests are handled within two seconds. Thus, a single instance of a request taking longer than two seconds would not be considered sufficient to result in the question asked at step 304 being answered in the affirmative, to the effect that the operation is considered to be substandard. Substandard operation occurs when 20% of requests are not processed within the specified two second period. It can be appreciated that those skilled in the art could develop many algorithms in order to determine whether the criteria are met such that the question posed at step 304 may be implemented.

FIG. 6

Figure 6:
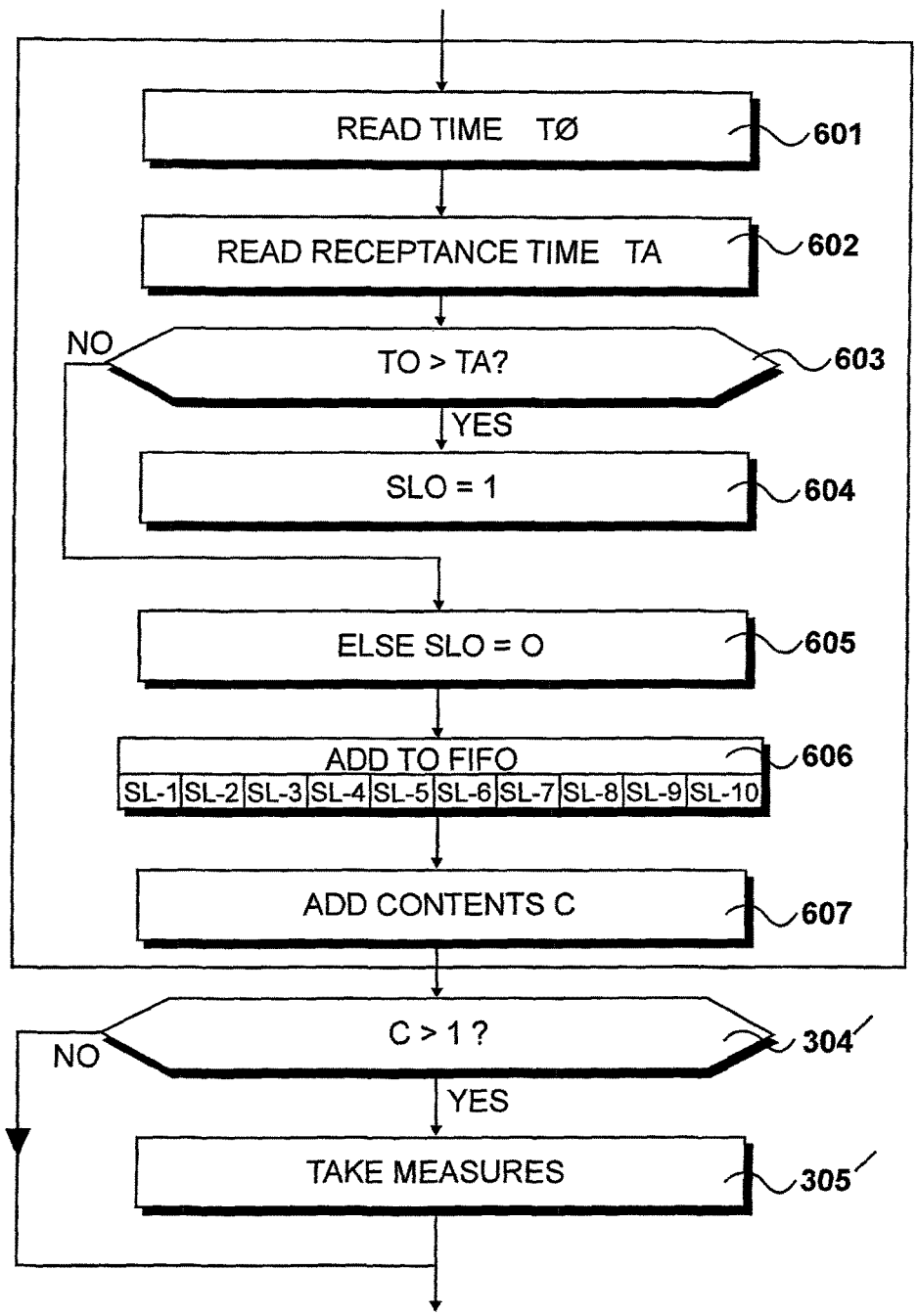
FIG. 6 details procedures for comparing responses, identified in FIG. 3.

The following, described with reference to FIG. 6, provides an example for illustration purposes only and it should be appreciated that many algorithms of this type would satisfy the requirements of an enabling embodiment.

At step 601, the time recorded at step 508 is read and in this example identified as time T0. At step 602 an acceptable time is read, ie the maximum acceptable time which in this example has been identified as two seconds.

At step 603 a question is asked as to whether T0, the measured time, is bigger than the acceptable time TA. If T0 is larger than TA the access time as previously described and as recorded as T0, will be greater than two seconds. Under these circumstances service level zero (SL0) is recorded as being equal to one at step 604. If the question asked at step 603 is answered in the negative, to the effect that T0 is smaller than or equal to TA, the else condition at step 605 results in SL0 being set to zero.

As previously stated, a single instance does not allow a decision to be made and is necessary for an averaging process to be performed over a number of samples. Thus, in this embodiment, the value for the service level is added to a first in first out (FIFO) buffer 606 which allows ten values to be added together. Thus, the ones and zeros generated by procedures 603 to 605 are added to FIFO 606 resulting in the previous ten samples being included within the FIFO. The contents of the FIFO are therefore added at step 607.

An unacceptable result will cause a one to be generated and an acceptable result will cause a zero to be generated. Unacceptable operation has been established at the 20% value, therefore if FIFO 606 contains two or more values of one, the total when added together will be a value greater than one, and this is considered to be unacceptable operation. Thus, in this simplistic embodiment, a single instance of a long access time in ten samples would be disregarded. However, should two or more such occurrences take place within the ten sample period, the question asked at step 304' (being equivalent to step 304) results in measures being taken at step 305' (equivalent to step 305).

In a preferred embodiment, the sample period may take place over a much longer duration and the algorithm performed may be more sophisticated.

In an alternative embodiment it may be possible to provide a more refined degree of optimisation so that measures are only taken when absolutely necessary and the maximum number of transactions take place without these additional measures being enforced. Thus, based on an assessment of the server response, it could be possible for the measures to be taken for a proportion of the transactions, in which this proportion gradually increases as the server response continues to degrade. Thus, as degradation is identified the procedures may be such that only 10% of transactions involve measures being taken. However, if this is not sufficient to relieve the burden placed upon the servers, measures may be taken for 20% of the transactions and then 30% of the transactions and so on until measures are taken for all of the transactions.

In an alternative embodiment it may be more appropriate to prevent a situation in which a flip flopping occurs between measures being taken and measures not being taken. Thus, for a particular application the switching from a state in which measures are to being taken to a state in which measures are taken and then switching back to the measures not being taken again may place an unnecessary burden upon equipment. For example, it may be necessary for a different area of disc to be accessed thereby resulting in regular large movements of disc heads which in turn would place strain upon the servers and ultimately reduce their life expectancy. Consequently, in some environments it may be preferable to introduce a degree of hysteresis. Thus, in accordance with this preferred embodiment, a preferred system may be established such that it appears reluctant to force measures to be taken in order to relieve strain upon the servers. Thus, a greater level of degradation may be considered acceptable before measures are taken. Thus, when in its first state of normal operation, a criteria may be established such that 80% of transactions take no longer than three seconds to be serviced. Thus, only when these criteria are not being met will the operation be considered to be substandard and the question asked at step 304 will be answered in the affirmative, resulting in measures being taken. However, now that the question asked at step 304 has been answered in the affirmative measures will continue to be taken until a much higher level of performance is achieved. Thus, for the purposes of illustration, standard operation may be specified as 90% of all transactions taking no more than one second. Thus, once measures start to be taken, they will tend to be continued until demand has decreased significantly and only then will operation return to its preferred state.

Thus, it can be appreciated that many modifications are available in terms of making the assessment as to whether satisfactory operation is taking place and a preferred approach may be constrained by other limitations within the system as a whole.

FIG. 7

Figure 7:
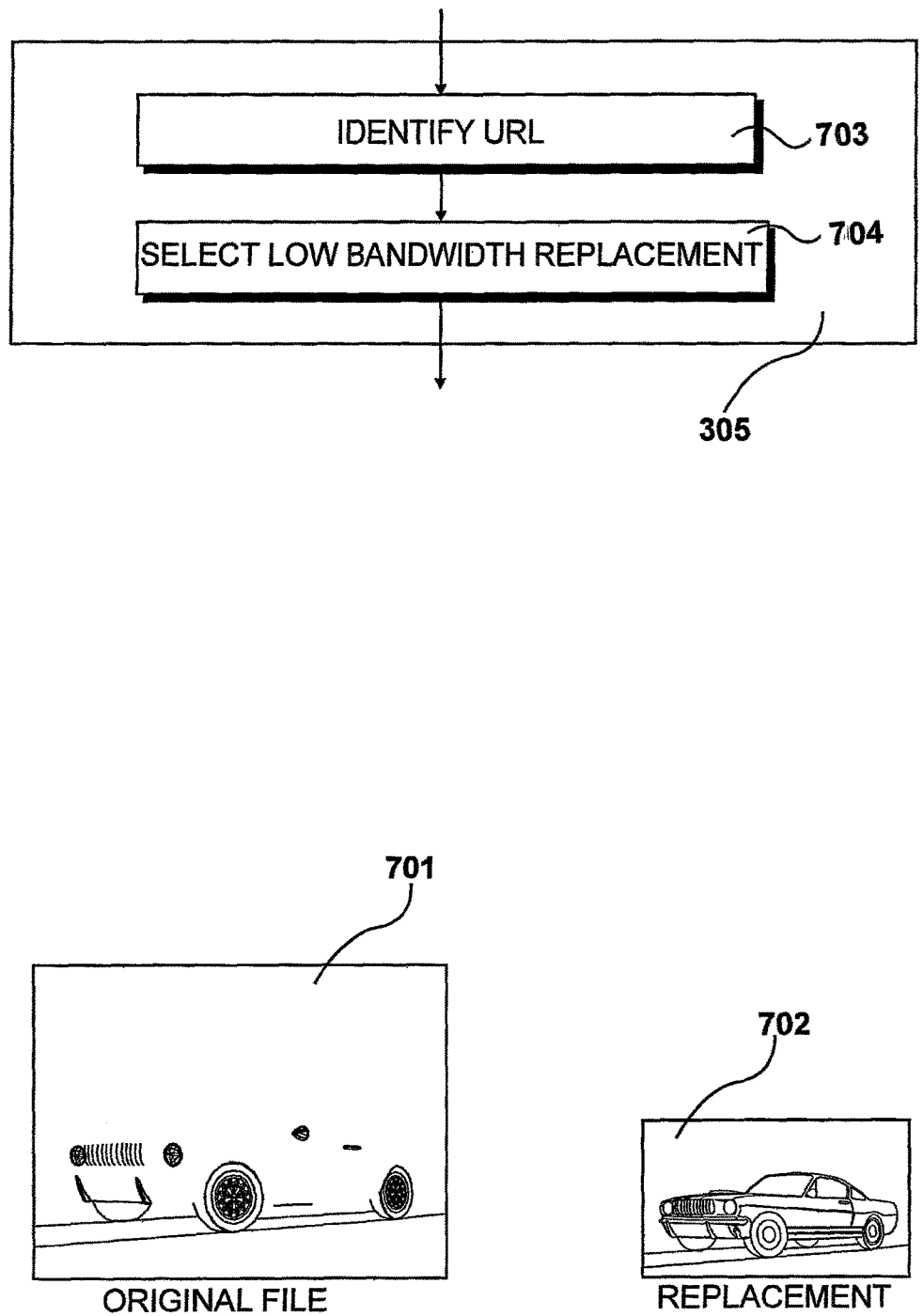
FIG. 7 illustrates the taking of measures, of the type identified in FIG. 3.

An illustration of measures that may be taken upon identifying substandard operation as illustrated in FIG. 7. In this example, an original file includes a high definition image 701 and the serving of this high definition image will incur a relatively large demand upon the server concerned. When the level of operation is identified as being substandard, measures are taken such that instead of serving high definition image 701, a substantially similar image 702 of lower definition is served as a replacement. Thus, a web page could include several images of this type or a web page could be totally reconfigured such that substantially the same information is contained therein but the actual amount of data required to transmit the information has been substantially reduced.

Thus, an example of measures 305 are illustrated in FIG. 7. Thus, at step 703 the URL is identified and at step 704 the URL identified at step 703 is replaced with an alternative URL. Thus, the alternative URL points to an alternative file, which substantially contains the same information but in such a way that requires less data and therefore has a shorter access time. Thus, in this specific example, the low bandwidth URL replacement is selected such that picture 702 is served as an alternative to high definition picture 701.

In an alternative configuration, a modification of image quality could occur without selecting an alternative URL but by performing alternative measures at the server itself. Thus, the data file could be read in a different way such that a decimation of image data occurs.

In an alternative embodiment, it may be necessary for a server to perform calculations in order to generate a requested web page. For example, the server may be configured to generate an image showing a map in response to a location being specified. However, it may be possible for the degree of detail contained within the map to be modified depending upon a detection of substandard operation. Thus, in a preferred mode of operation a map may contain considerable detail showing images of particular buildings for example. However, when downgraded, the images of the buildings could be replaced by symbols and the degree of detail contained within the map could be reduced significantly. However, the essential information content remains the same.

It is also appreciated that files other than web pages may be used within this environment. Thus, the stored files may represent video clips and as such video clips of differing definition may be supported and selected depending upon the identification of substandard operation. In an alternative embodiment the service itself may include web pages or similar files that are updated on a regular basis. Consequently, in the preferred mode of operation these files are generated each time a request is made. However, when substandard operation starts to occur, it may be preferable to cache files such that the same data may be served several times with updates occurring on a much less frequent basis. Thus, it should be appreciated to those skilled in the art that many other types of degradation may .occur and be considered appropriate for the measures taken at step 305 without departing form the essential nature of the invention.

FIG. 8

Figure 8:
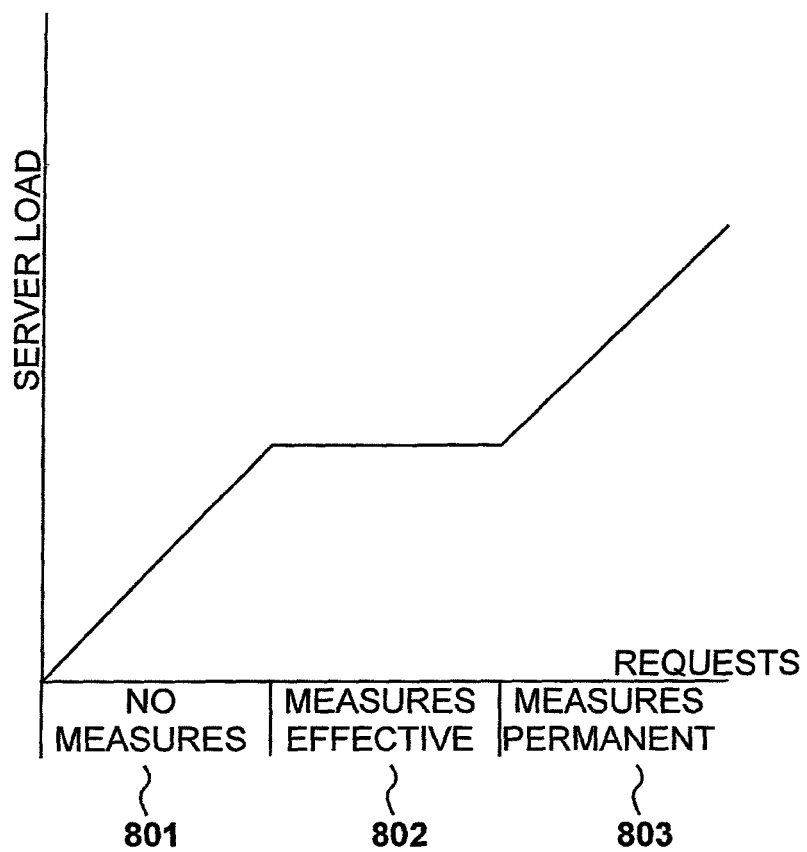
FIG. 8 illustrates server load.

A graph for illustrative purposes only is illustrated in FIG. 8 in which server load has been plotted against the number of requests made. This shows operation of the server within the environment of the present invention effectively taking place in three possible modes. In a first mode of operation 801 it is not necessary for any measures to be taken given that the load placed on the servers is relatively low and all of the requested data is being supplied back at full bandwidth. Thus, for example requests may be received at the traffic manager at a rate of say five per second. At the other extreme, the traffic manager may be receiving requests in the order of thousands per second resulting in the third mode of operation 803 where the enforcement of measures being taken occurs on a permanent basis. Thus, so many requests are being received that it is not possible for the servers to operate in their preferred mode of operation without introducing substantial delays and occasionally dropping connections. Thus, measures are taken at step 305 for all transactions which may then result in a degradation of spatial definition for all data sent back to the requesting stations.

The intermediate mode of operation identified as 802 may be considered as that where the measures taking place are having substantial effect upon the quality of service provided by the system. In the example of FIG. 8 there is no hysteresis such that having implemented the taking of measures the demand placed upon the servers may be considered as relatively constant as the number of requests increases. However, eventually, the number of requests will be such that the server load starts to increase substantially as the third mode of operation 803 is entered.

Thus, to summarise, there is a first mode of operation in which it is never necessary to take measures. There is then a second mode of operation during which measures are taken on some occasions and then not on others. Thus, measures may be taken for a proportion of the transactions or a flip flopping may occur between normal operation and modified operation. Finally, there is a third mode of operation in which measures are taken all of the time and all transactions take place in what may be considered a substandard mode of operation.

The embodiment monitors server response to determine a degree of load placed upon the servers. Secondly, having measured the response, a comparison takes place to determine whether the system is operating as desired or whether substandard operation is taking place. Finally, when the substandard mode of operation is identified, measures are taken in order to rectify this such that requesting stations still receive web pages within an acceptable period of time.

What is claimed is:

1. A traffic management system having multiple operational modes, comprising:
   a first interface to communicate with clients;
   a second interface to communicate with at least one server; and
   a processing device for:
   monitoring response times of the server when responding to requests from the clients;
   responsive to determining that a most recent response time of the server is greater than a threshold response time, inserting a first value into a first-in-first-out (FIFO) queue;
   responsive to determining that the most recent response time of the server is less than or equal to the threshold response time, inserting a second value into the FIFO queue;
   computing a service level based on values stored in the FIFO;
   switching the traffic management system from a first operational mode to a second operational mode when (1) the traffic management system is operating in the first operational mode, and (2) the service level is worse than a first service level;
   switching the traffic management system from the second operational mode to the first operational mode when (1) the traffic management system is operating in the second operational mode, and (2) the service level is better than a second service level;
   processing the requests received from the clients based on an operational mode of the traffic management system, wherein in the first operational mode no measures are taken to improve the service level, and wherein in the second operational mode at least one measure is taken to improve the service level.

2. The traffic management system of claim 1, wherein the at least one measure that is taken to improve the service level comprises:
   modifying a request received from a client by replacing a reference to a high resolution image in the request with a reference to a low resolution image; and
   sending the modified request to the server.

3. The traffic management system of claim 1, wherein all communication between the clients and the server passes through the traffic management device.

4. An apparatus, comprising:
   a first interface to communicate with clients;
   a second interface to communicate with at least one server;
   a processor; and
   a non-transitory computer-readable storage medium storing instructions that, when executed by the processor, cause the apparatus to perform a method comprising:
      receiving requests from clients via the first interface;
      processing requests based on a current operational mode, wherein in a first operational mode no measures are taken to improve a service level, and wherein in a second operational mode at least one measure is taken to improve the service level;
      sending the processed requests to the server via the second interface;
      monitoring response times of the server when responding to requests from the clients;
      responsive to determining that a most recent response time of the server is greater than a threshold response time, inserting a first value into a first-in-first-out (FIFO) queue;
      responsive to determining that the most recent response time of the server is less than or equal to the threshold response time, inserting a second value into the FIFO queue;
      computing the a service level based on values stored in the FIFO;
      switching from the first operational mode to the second operational mode when the service level is worse than a first service level;
      switching from the second operational mode to the first operational mode when the service level is better than a second service level.

5. The apparatus of claim 4, wherein the at least one measure that is taken to improve the service level comprises:
   modifying a request received from a client by replacing a reference to a high resolution image in the request with a reference to a low resolution image; and
   sending the modified request to the server.

6. The apparatus of claim 4, wherein all communication between the clients and the server passes through the apparatus.

7. A traffic management system having multiple operational modes, comprising:
   a first interface to communicate with clients;
   a second interface to communicate with at least one server; and
   a processing device for:
      monitoring response times of the server when responding to requests from the clients;
      responsive to determining that a most recent response time of the server is greater than a threshold response time, inserting a first value into a first-in-first-out (FIFO) queue;
      responsive to determining that the most recent response time of the server is less than or equal to the threshold response time, inserting a second value into the FIFO queue;
      computing a service level based on values stored in the FIFO;
      switching the traffic management system from a first operational mode to a second operational mode when (1) the traffic management system is operating in the first operational mode, and (2) the service level is worse than a first service level;
      switching the traffic management system from the second operational mode to the first operational mode when (1) the traffic management system is operating in the second operational mode, and (2) the service level is better than a second service level;
      processing the requests received from the clients based on an operational mode of the traffic management system, wherein in the first operational mode no measures are taken to improve the service level, wherein in the second operational mode at least one measure is taken to improve the service level, and wherein the at least one measure that is taken to improve the service level comprises:
         receiving a modified response from the server, wherein prior to sending the modified response to the client,
         the server retrieves an image; and
         the server selectively modifies the retrieved image by replacing at least one portion of the image with an alternate representation while retaining essential information content of the image, wherein the essential information content of the image comprises geographical details in a map corresponding to a location specified in the request, and wherein the alternate representation is a symbol that represents a geographical feature in the map.

* * * * *